July 18, 1967

F. F. VAN RADEN ETAL 3,331,458

PNEUMATIC WEIGHING SYSTEM FOR LOAD CARRYING VEHICLES

Filed Aug. 19, 1965

FREDERICK F. VAN RADEN
KENNETH A. BRATLIE
INVENTORS

BY
BUCKHORN, BLORE, KLARQUIST & SPARKMAN
ATTORNEYS

July 18, 1967 F. F. VAN RADEN ETAL 3,331,458
PNEUMATIC WEIGHING SYSTEM FOR LOAD CARRYING VEHICLES
Filed Aug. 19, 1965 2 Sheets-Sheet 2

FREDERICK F. VAN RADEN
KENNETH A. BRATLIE
INVENTORS
BY
BUCKHORN, BLORE, KLARQUIST & SPARKMAN
ATTORNEYS

United States Patent Office 3,331,458
Patented July 18, 1967

3,331,458
PNEUMATIC WEIGHING SYSTEM FOR LOAD CARRYING VEHICLES
Frederick F. Van Raden, Portland, and Kenneth A. Bratlie, Hillsboro, Oreg., assignors to Peerless Trailer & Truck Service, Inc., Portland, Oreg., a corporation of Oregon
Filed Aug. 19, 1965, Ser. No. 481,002
7 Claims. (Cl. 177—141)

This invention relates to vehicle-carried pneumatic weighing means for load carrying vehicles wherein the load is pneumatically supported and, more particularly, to a pneumatic weighing system which is attached to the pneumatic system which operates the supports that cushion the load.

Load carrying vehicles have been equipped with pneumatic supports for cushioning the loads thereon. These pneumatic supports, which may be in the form of air springs or bellows, suspend the load from direct contact with the vehicle's axles, thereby to provide a soft ride. The pneumatic supports are generally four in number, two on either side of the vehicle. They are connected to a source of air under pressure, which typically is the same source that operates the air brakes on the vehicle. In order to prevent excessive side sway, apparatus is generally provided to control the side forces that act upon the load, and such apparatus commonly takes the form of leveling valves which adjust the height of the load on either side of the vehicle by increasing and decreasing the pressure in the respective pneumatic supports.

It is an object of the present invention to provide a pneumatic weighing means for vehicles equipped as above described.

It is a further object of the present invention to provide pneumatic weighing means which can be attached to the pneumatic system which operates the pneumatic supports in the system above described.

These objects are attained by providing valve means in the conduit that connects the source of compressed air to the pneumatic supports, the valve means being adapted upon actuation to disconnect the source from the pneumatic supports. Thus a closed pneumatic system is formed, to which pneumatic weighing means are connected.

Other objects and advantages will become apparent from a consideration of the following description in conjunction with the accompanying drawings, wherein.

Figure 1:
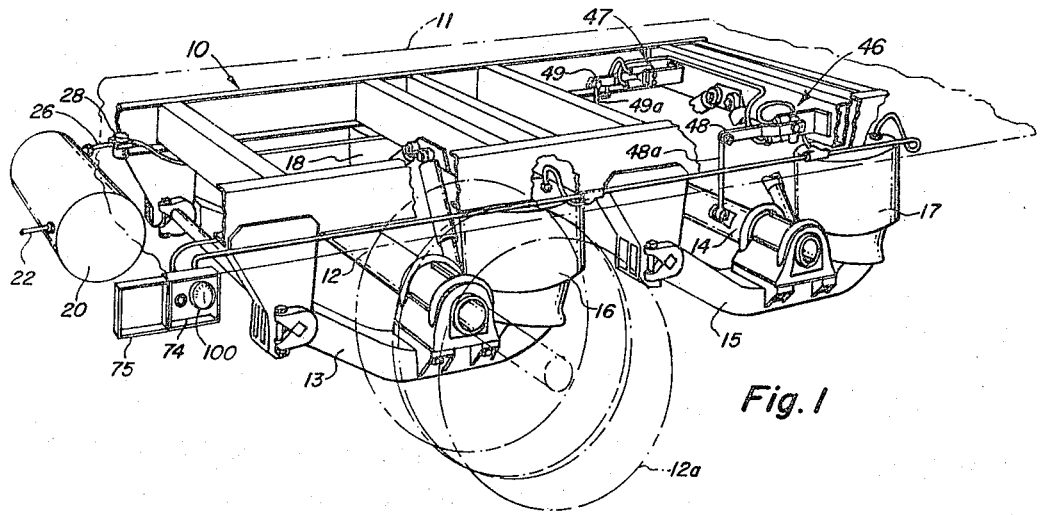
FIG. 1 is a perspective view of a pneumatically supported truck trailer bed in which the present invention may be incorporated.

Referring to the drawings, there is shown the supporting framework 10 for a truck trailer bed 11 (shown in phantom in FIG. 1). The framework 10 is supported by front and rear axle housings 12 and 14, respectively. Dual wheels 12a are also shown in phantom in FIG. 1.

The axle housings 12 and 14 are attached to the framework 10 by trailing arms 13 and 15, respectively, and are also supported by four air springs or bellows 16, 17, 18 and 19. Air springs 16 and 17 are at the front and rear of one side of the trailer bed 10, respectively; air springs 18 and 19 are at the front and rear of the other side of the trailer bed 10, respectively.

Figure 2:
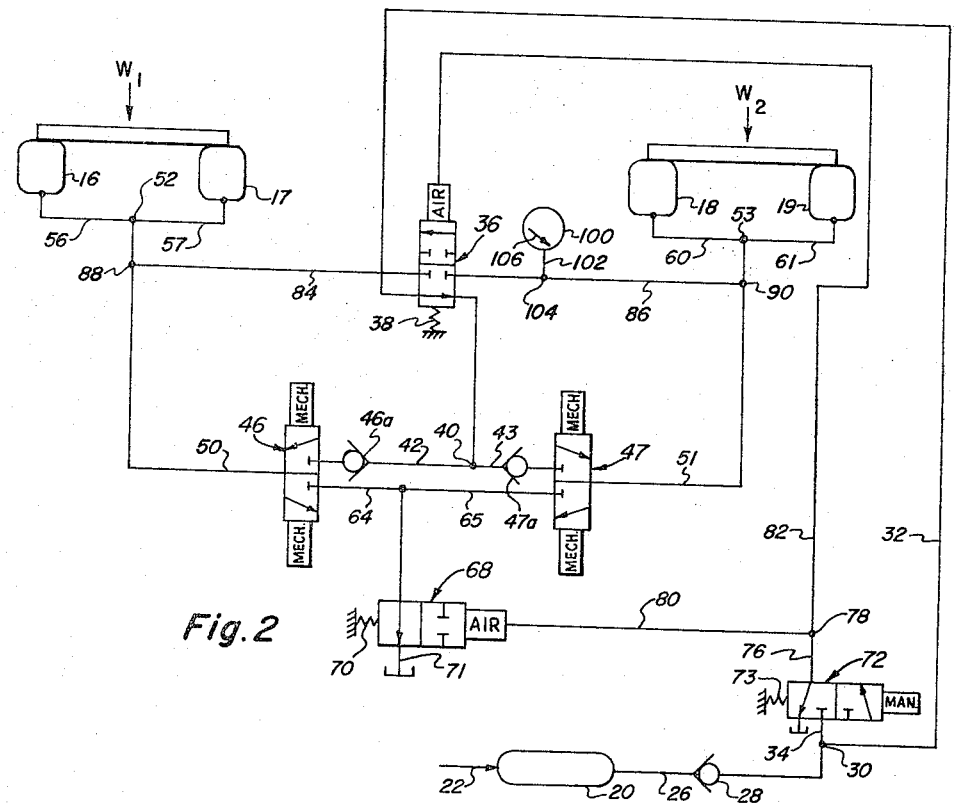
FIG. 2 is a schematic view of the conduits and controls comprising the pneumatic system for the load carrying vehicle shown in FIG. 1, with the apparatus of the present invention shown in its normal or non-load measuring position.
Figure 3:
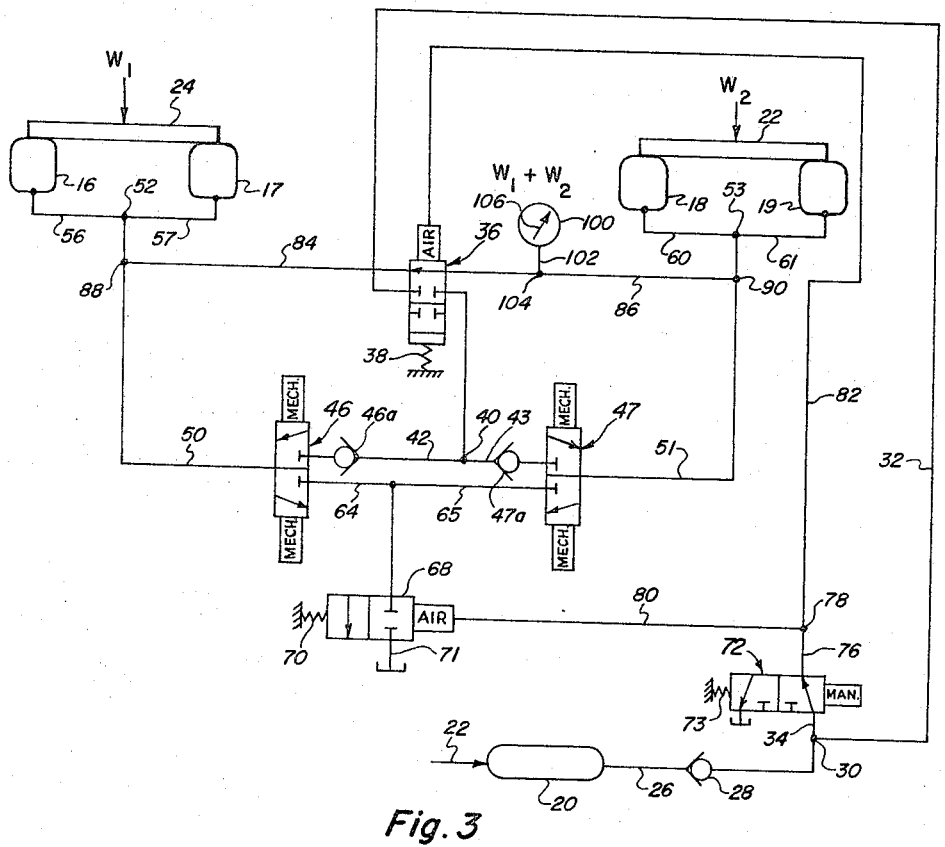
FIG. 3 is a schematic view similar to that of FIG. 2, but showing the apparatus of the present invention in its load-measuring position.

A reservoir of compressed air 20 is provided as shown, and this reservoir is conveniently the same reservoir that provides air for the vehicle's air brakes. The reservoir 20 is connected to a source of compressed air (not shown) by a conduit 22. Attached to the other side of the reservoir 20 is a conduit 26. A check valve 28 is placed in the conduit 26 and is attached to the framework 10. A T 30 is provided at the end of the conduit 26, thus permitting conduit 26 to communicate with conduits 32 and 34, as shown in FIGS. 2 and 3.

The conduit 32 leads to a 4-way valve 36, which is biased by means of a spring 38 to a normally closed position. Compressed air passing through the conduit 32 flows into the valve 36 and, in the valve's normal position, is by-passed through a T 40 into conduits 42 and 43, as shown. The conduits 42 and 43 communicate with leveling or height control valves 46 and 47 respectively. Valves 46 and 47 are shown in FIGS. 2 and 3 in their neutral position. Check valves 46a and 47a are provided as shown.

The leveling or height control valves 46 and 47 are attached to the framework 10 in any convenient manner and are actuated by means of levers 48 and 49, respectively. The levers 48 and 49 are attached to rods 48a and 49a, which are connected to the rear axle housing 14. Variations in the positions of the levers 48 and 49 increase or decrease the air pressure in the air springs 16, 17, 18 and 19 in a manner to be hereinafter described.

Leading from the valves 46 and 47 are conduits 50 and 51, respectively, which communicate with T's 52 and 53, respectively. The T 52 communicates in turn with conduits 56 and 57, which conduits communicate with the air springs 16 and 17, respectively. The T 53 communicates with conduits 60 and 61, which conduits communicate with the air springs 18 and 19, respectively.

Also attached to the leveling or height control valves 46 and 47 are exhaust conduits 64 and 65, respectively. The conduits 64 and 65 lead to a two-way valve 68, which is biased by means of a spring 70 to a normally open position. Leading from the valve 68 is an exhaust pipe 71, which is open to the atmosphere.

As the vehicle rounds a curve there will normally be an excess of load on the air springs on one side of the vehicle and a lesser load on the air springs on the other side of the vehicle. Assuming by way of example that it is the air springs 16 and 17 that are overloaded, they will, therefore, be reduced in height. The lever 48 on the overloaded side will be tipped upwardly about is connection to the valve 46, and this will cause the valve 46 to move to the position thereby the conduit 42 communicates with the conduit 50, thereby to permit an additional amount of compressed air to be introduced through the conduit 42, into the leveling or height control valve 46, through the conduits 50, 56 and 57 and into the overloaded air springs 16 and 17. The air springs 18 and 19 on the other side of the vehicle, however, will have less load on them and will thus experience an increase in height. This will cause the lever 49 on the underloaded side to be tipped downwardly about its connection to the valve 47 to move the valve to the position wherein the exhaust conduit 65 communicates with the conduit 51, thereby to permit air to be passed from the air springs 18 and 19 through the conduits 60 and 61, into the conduit 51, through the valve 47, out the conduit 65, through the normally open valve 68 and out the exhaust pipe 71. Thus, variations in the load on each of the air springs 16, 17, 18 and 19 will cause compensating increases or decreases in the pressures therein, thereby to maintain the total load on the vehicle in a substantially horizontal position at all times.

The pneumatic weighting means of the present invention is attached to the pneumatic suspension system above described in the following manner. A conduit 34 is attached to the T 30, as above described. The conduit 34 leads to a manually operated pilot valve 72 which is conveniently attached to the panel 74 mounted just forward of the trailer suspension at the side of the trailer body. (See FIG. 1.) The valve 72 is biased by a spring 73 to a normally closed position, thereby to maintain the weighting system disconnected from the pneumatic suspension system until it is desired to weight the total load on the trailer. A hinged cover 75 is provided for the panel 74, as shown.

The valve 72 communicates with a conduit 76, which in turn communicates with a T 78, as shown. The T 78 communicates with conduits 80 and 82.

The conduit 82 leads to the 4-way valve 36. Also attached to the valve 36 are conduits 84 and 86. The conduit 84 communicates with a T 88, which in turn communicates with the conduit 50 and the conduits 56 and 57, as shown. The conduit 86 communicates with a T 90, which in turn communicates with the conduit 51 and the conduits 60 and 61, as shown.

The conduit 80 leading from the T 78 communicates with the valve 68.

The weighing system of the present invention is inoperative during the normal operation of the vehicle. This is shown in FIG. 2. Thus, unless the manually operated pilot valve 72 is actuated, no communication is effected between the conduits 34 and 76 and, thus, no air under pressure is introduced through the conduit 76 into the conduits 80 and 82. The 4-way valve 36 is maintained by the spring 38 in its noramlly closed position, and no communication is possible between the conduits 84 and 86. Likewise, the absence of air under pressure from the conduit 80 leaves the two-way valve 68 in its normally open position, thereby to permit air to exhaust from the suspension system as required by the leveling or height control valves 46 and 47.

In order to weigh a load on the trailer, the valve 72 is manually actuated, the valves 46 and 47 being in their neutral position. This establishes communication between the conduits 34 and 76 and permits air under pressure to enter the conduit 76. The air under pressure flows through the conduit 76 and into the conduits 80 and 82. (See FIG. 3.)

The air under pressure that enters the conduit 82 actuates the 4-way valve 36, as shown in FIG. 3. Actuation of the valve 36 cuts off the flow of air between the conduit 32 and the conduits 42 and 43. The actuation of the valve 36 also establishes direct communication between the conduits 84 and 86, thereby establishing direct communication between air springs 16, 17, 18 and 19.

The introduction of air under pressure into the conduit 80 actuates the valve 68 to close the exhaust pipe 71. Thus, the air pressure is equalized in the air springs 16, 17, 18 and 19, since the conduits 50 and 51 are connected, and since the supply line and the exhaust pipe are closed, no air can enter or leave the system. The load $W_1$ on the air spring 16 and 17 and the load $W_2$ on the air springs 18 and 19 thus act together on the closed pneumatic system which is formed.

A properly calibrated pneumatic scale 100 may be attached at any point along the system thus closed. In the example shown, a scale 100 is attached to a conduit 102, which is attached by means of a T 104 to the conduit 86. The scale 100 is also conveniently mounted on the panel 74.

The scale 100 has a pointer 106, which indicates the total weight $W_1+W_2$ on the air springs 16, 17, 18 and 19. In order to calibrate the scale 100, the correct legal load must first be determined by loading the trailer to the maximum legal load, using a conventional platform scale and then noting the corresponding number appearing on the scale 100. By weighing a few varying loads it is possible to determine for each mark on the face of the scale 100 a weight value for the load on the trailer.

From the foregoing it will now be seen that we have provided pneumatic weighing means that accomplishes all of the stated objects of this inventon and includes many advantages of great practical utility and commercial importance. It is also to be understood that the invention may be embodied in specific forms other than the one shown and described without departing from the spirit or essential characteristics thereof. The present embodiment is, therefore, to be considered merely as illustrative and not restrictive, the scope of the invention being limited only by the following claims.

We claim:

1. In a load carrying vehicle wherein the load is pneumatically supported and said vehicle has a source of air under pressure, a plurality of pneumatic supports supporting said load, and first conduit means joining said source to said pneumatic supports, the improvement comprising:
   first valve means interposed in said first conduit means between said source of air under pressure and said pneumatic supports,
      said first valve means being adapted upon actuation to disconnect said source from said pneumatic supports;
   second valve means interposed in said first conduit means between said source and said first valve means;
   second conduit means joining said first and second valve means,
      said second valve means being adapted upon actuation to permit air under pressure to flow through said second conduit means, thereby to actuate said first valve means;
   pneumatic scale means calibrated to read the weight of said load on said pneumatic supports; and
   means to connect said pneumatic scale means to said first conduit means between said first valve means and said pneumatic supports.

2. In a load carrying vehicle wherein the load is pneumatically supported and said vehicle has a source of air under pressure, the combination comprising:
   a plurality of pneumatic supports divided into two groups,
      the first of said groups of pneumatic supports supporting one part of said load,
      the second of said groups of pneumatic supports supporting the balance of said load;
   first conduit means attached to said source;
   second conduit means joining said first conduit means to said first group of pneumatic supports;
   third conduit means joining said first conduit means to said second group of pneumatic supports;
   first valve means interposed in said first conduit means,
      said first valve means being adapted upon actuation to connect said second and third conduit means and to disconnect said source therefrom,
      said pneumatic supports and said second and third conduit means thereby forming a closed pneumatic system;
   second valve means interposed in said first conduit means between said source and said first valve means;
   fourth conduit means joining said first and second valve means,
      said second valve means being adapted upon actuation to permit air under pressure to flow through said fourth conduit means, thereby to actuate said first valve means;
   pneumatic scale means calibrated to read the weight of said load upon said pneumatic supports; and
   means to connect said pneumatic scale means to said closed pneumatic system.

3. In a load carrying vehicle wherein the load is pneumatically supported and said vehicle has a source of air under pressure, the combination comprising:

a plurality of pneumatic supports divided into two groups,
   the first of said groups of pneumatic supports supporting one part of said load,
   the second of said groups of pneumatic supports supporting the balance of said load;
a first conduit attached to said source;
a second conduit joining said first conduit to said first group of pneumatic supports;
a third conduit joining said first conduit to said second group of pneumatic supports;
a first valve interposed in said first conduit between said source of air under pressure and said second and third conduits,
   said first valve being adapted upon actuation to connect said second and third conduits and to disconnect said source therefrom,
   said pneumatic supports and said second and third conduits thereby forming a closed pneumatic system;
a second valve interposed in said first conduit between said source and said first valve;
a fourth conduit joining said first and second valves,
   said second valve being adapted upon actuation to permit air under pressure to flow through said fourth conduit, thereby to actuate said first valve;
a pneumatic scale calibrated to read the weight of said load upon said pneumatic supports; and
a fifth conduit joining said pneumatic scale to said closed pneumatic system.

4. In a load carrying vehicle wherein the load is pneumatically supported and said vehicle has a source of air under pressure, the combination comprising:
a plurality of pneumatic supports divided into two groups,
   the first of said groups of pneumatic supports supporting one part of said load,
   the second of said groups of pneumatic supports supporting the balance of said load;
a first conduit attached to said source;
a second conduit joining said first conduit to said first group of pneumatic supports;
a third conduit joining said first conduit to said second group of pneumatic supports;
a first valve interposed in said first conduit between said source of air under pressure and said second and third conduits;
a fourth conduit joining said first valve and said second conduit;
a fifth conduit joining said first valve and said third conduit;
a second valve interposed in said first conduit between said source and said first valve;
a sixth conduit joining said first and second valves,
   said second valve being adapted upon actuation to permit air under pressure to flow through said sixth conduit, thereby to actuate said first valve,
   said first valve being adapted upon actuation to connect said fourth and fifth conduits and to disconnect said second and third conduits from said source of air under pressure,
   said pneumatic supports and said second, third, fourth and fifth conduits thereby forming a closed pneumatic system;
a pneumatic scale calibrated to read the weight of said load upon said pneumatic supports; and
a seventh conduit connecting said pneumatic scale with said closed pneumatic system.

5. In a load carrying vehicle where the load is pneumatically supported and said vehicle has a source of air under pressure, the combination comprising:
a plurality of pneumatic supports divided into two groups,
   the first of said groups of pneumatic supports supporting one part of said load,
   the second of said groups of pneumatic supports supporting the balance of said load;
first conduit means attached to said source;
second conduit means joining said first conduit means to said first group of pneumatic supports;
third conduit means joining said first conduit means to said second group of pneumatic supports;
first valve means interposed in each of said second and third conduit means for increasing and decreasing the amounts of air under pressure in said first and second groups of pneumatic supports in response to changes in load on said first and second groups of pneumatic supports;
exhaust means connected to said first valve means and adapted to permit excess air to escape from said first and second groups of pneumatic supports;
second valve means interposed in said first conduit means,
   said second valve means being adapted upon actuation to connect said second and third conduit means and to disconnect said source therefrom;
third valve means interposed in said first conduit means between said source and said second valve means;
fourth conduit means joining said second and third valve means;
fourth valve means interposed in said exhaust means,
   said fourth valve means being adapted upon actuation to prevent air from escaping from said first and second groups of pneumatic supports;
fifth conduit means joining said third and fourth valve means,
   said third valve means being adapted upon actuation to permit air under pressure to flow through said fourth and fifth conduit means, thereby to actuate said second and fourth valve means, respectively, and to form said pneumatic supports and said second and third conduit means into a closed pneumatic system;
pneumatic scale means calibrated to read the weight of said load upon said pneumatic supports; and
means to connect said pneumatic scale means to said closed pneumatic system.

6. In a load carrying vehicle where the load is pneumatically supported and said vehicle has a source of air under pressure, the combination comprising:
a plurality of pneumatic supports divided into two groups,
   the first of said groups of pneumatic supports supporting one part of said load,
   the second of said groups of pneumatic supports supporting the balance of said load;
a first conduit attached to said source;
a second conduit joining said first conduit to said first group of pneumatic supports;
a third conduit joining said first conduit to said second group of pneumatic supports;
a first valve interposed in said second conduit for increasing and decreasing the amount of air under pressure in said first group of pneumatic supports in response to changes in load on said first group of pneumatic supports;
a second valve interposed in said third conduit for increasing and decreasing the amount of air under pressure in said second group of pneumatic supports in response to changes in load on said second group of pneumatic supports;
an exhaust conduit connected to said first and second valves for permitting air to escape from said first and second groups of pneumatic supports;
a third valve interposed in said first conduit,
   said third valve being adapted upon actuation to connect said second and third conduits and to disconnect said source therefrom;

a fourth valve interposed in said first conduit between said source and said third valve;
a fourth conduit joining said third and fourth valves;
a fifth valve interposed in said exhaust conduit,
    said fifth valve being adapted upon actuation to prevent said air from escaping from said first and second groups of pneumatic supports;
a fifth conduit joining said fourth and fifth valves,
    said fourth valve being adapted upon actuation to permit air under pressure to flow through said fourth and fifth conduits, thereby to actuate said third and fifth valves, respectively, and to form said pneumatic supports and said second and third conduits into a closed pneumatic system;
a pneumatic scale calibrated to read the weight of said load upon said pneumatic supports; and
a sixth conduit connecting said pneumatic scale to said closed pneumatic system.

7. In a load carrying vehicle where the load is pneumatically supported and said vehicle has a source of air under pressure, the combination comprising:
a plurality of pneumatic supports divided into two groups,
    the first of said groups of pneumatic supports supporting one part of said load,
    the second of said groups of pneumatic supports supporting the balance of said load;
a first conduit attached to said source;
a second conduit joining said first conduit to said first group of pneumatic supports;
a third conduit joining said first conduit to said second group of pneumatic supports;
a first valve interposed in said second conduit for increasing and decreasing the amount of air under pressure in said first group of pneumatic supports in response to changes in load on said first group of pneumatic supports;
a second valve interposed in said third conduit for increasing and decreasing the amount of air under pressure in said second group of pneumatic supports in response to changes in load on said second group of pneumatic supports;
an exhaust conduit connected to said first and second valves for permitting air to escape from said first and second groups of pneumatic supports;
a third valve interposed in said first conduit between said source of air under pressure and said second and third conduits;
a fourth conduit joining said third valve and said second conduit;
a fifth conduit joining said third valve and said third conduit,
    said third valve being adapted upon actuation to connect said fourth and fifth conduits and to disconnect said second and third conduits from said source of air under pressure;
a fourth valve interposed in said first conduit between said source and said third valve;
a fifth valve interposed in said exhaust conduit,
    said fifth valve being adapted upon actuation to prevent air from escaping from said first and second groups of pneumatic supports;
a sixth conduit joining said third and fourth valves;
a seventh conduit joining said fourth and fifth valves,
    said fourth valve being adapted upon actuation to permit air under pressure to flow through said sixth and seventh conduits, thereby to actuate said third and fifth valves, respectively, and to form said pneumatic supports and said second, third, fourth and fifth conduits into a closed pneumatic system;
a pneumatic scale calibrated to read the weight of said load upon said pneumatic supports; and
an eighth conduit connecting said pneumatic scale to said closed pneumatic system.

References Cited

UNITED STATES PATENTS

| | | | |
|---|---|---|---|
| 601,339 | 3/1898 | Freeman | 177—209 |
| 2,110,809 | 3/1938 | Murphy | 280—112 |
| 2,115,159 | 3/1938 | Dupuy et al. | 280—112 |
| 2,623,758 | 12/1952 | Cruz | 280—112 |
| 3,035,851 | 5/1962 | Stengelin | 280—112 |
| 3,038,739 | 6/1962 | Vogel | 280—112 |

FOREIGN PATENTS

| | | |
|---|---|---|
| 416,063 | 9/1934 | Great Britain. |

RICHARD B. WILKINSON, *Primary Examiner.*

ROBERT S. WARD, *Assistant Examiner.*